Nov. 21, 1939.  J. H. McMAHON ET AL  2,180,639
AMUSEMENT APPARATUS
Filed Jan. 3, 1938     8 Sheets-Sheet 1

INVENTORS
JOHN H. McMAHON
ARTHUR W. MILLER
BY Harry Schwed
ATTORNEY

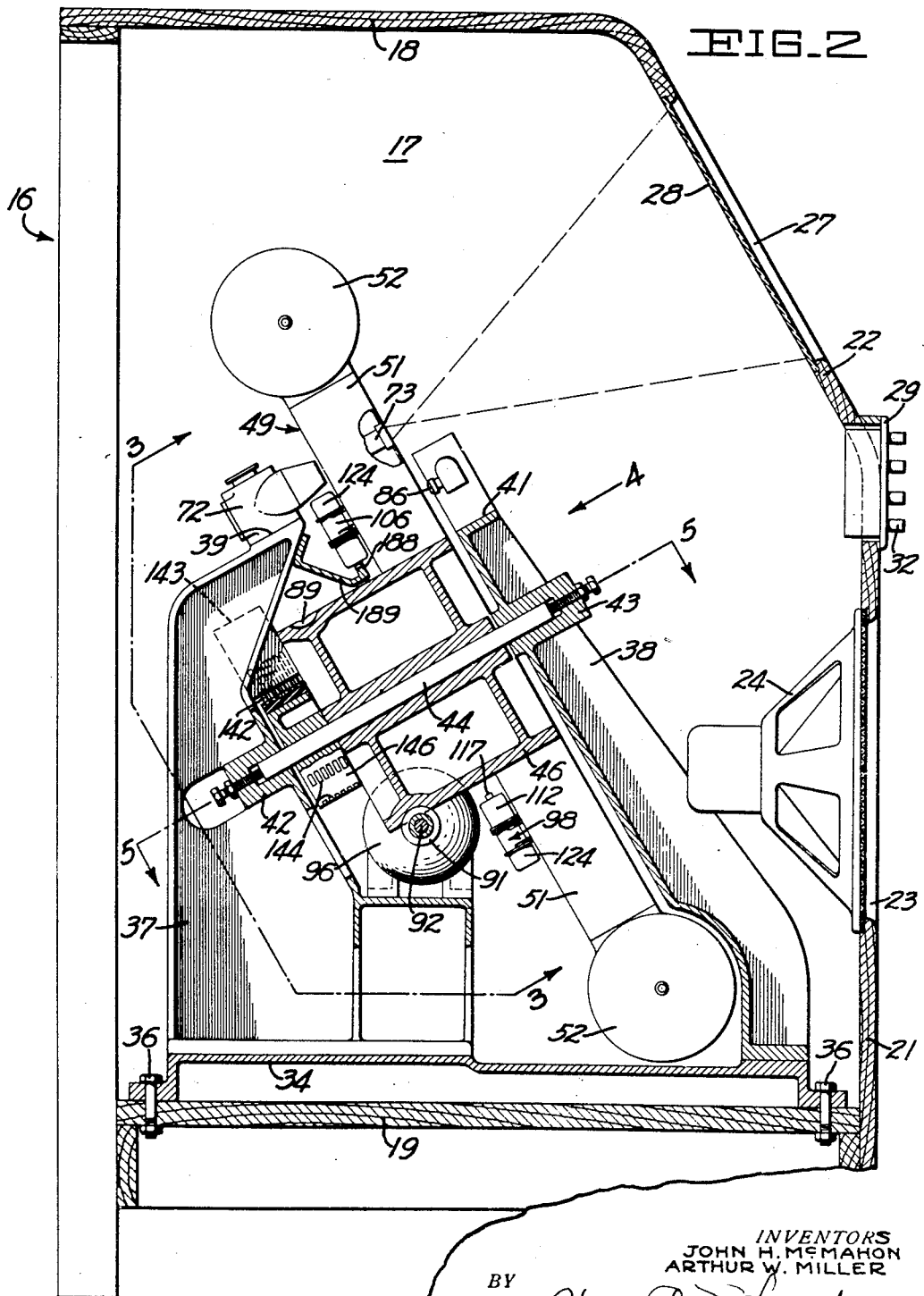

Nov. 21, 1939.    J. H. McMAHON ET AL    2,180,639
AMUSEMENT APPARATUS
Filed Jan. 3, 1938    8 Sheets-Sheet 3
FIG_3
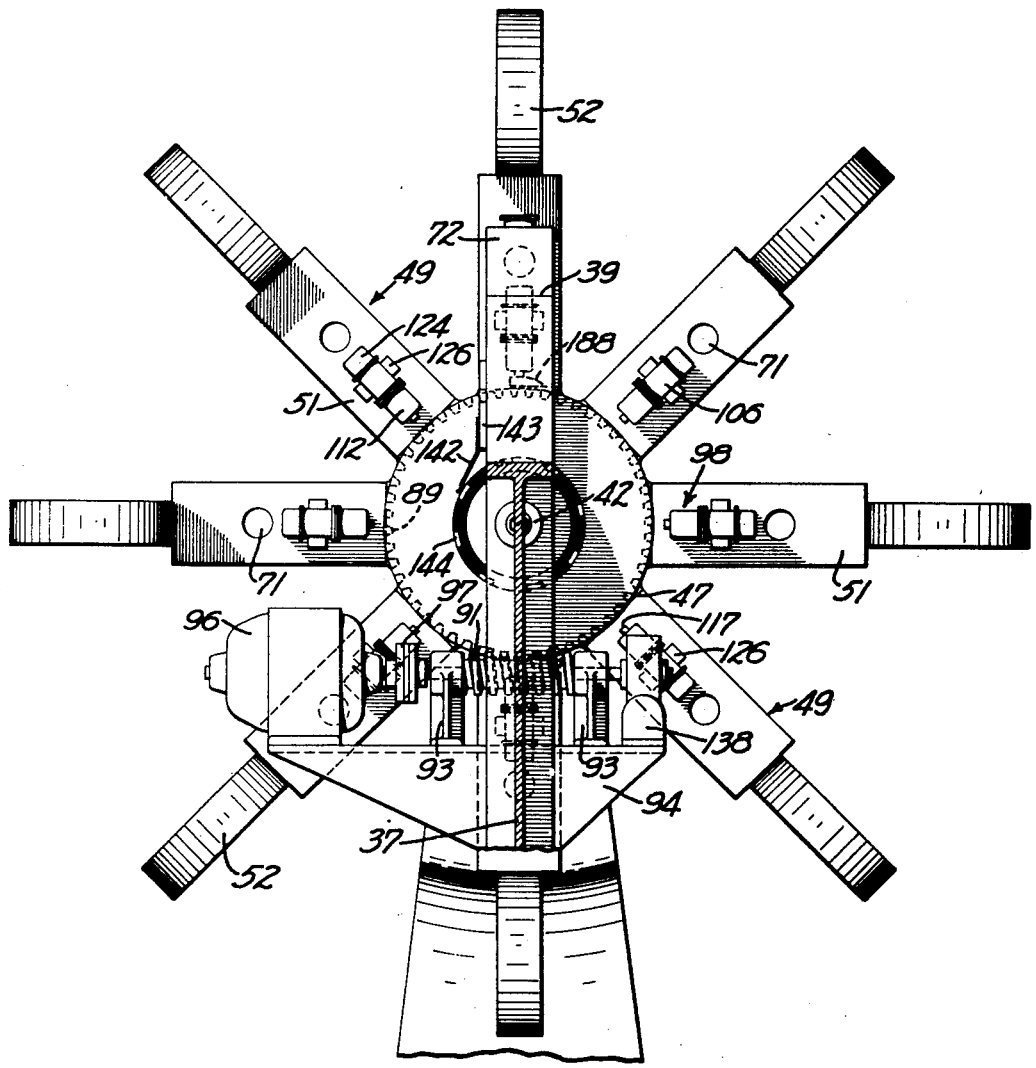
INVENTORS
JOHN H. McMAHON
ARTHUR W. MILLER
BY Harry G. Schroeder
ATTORNEY

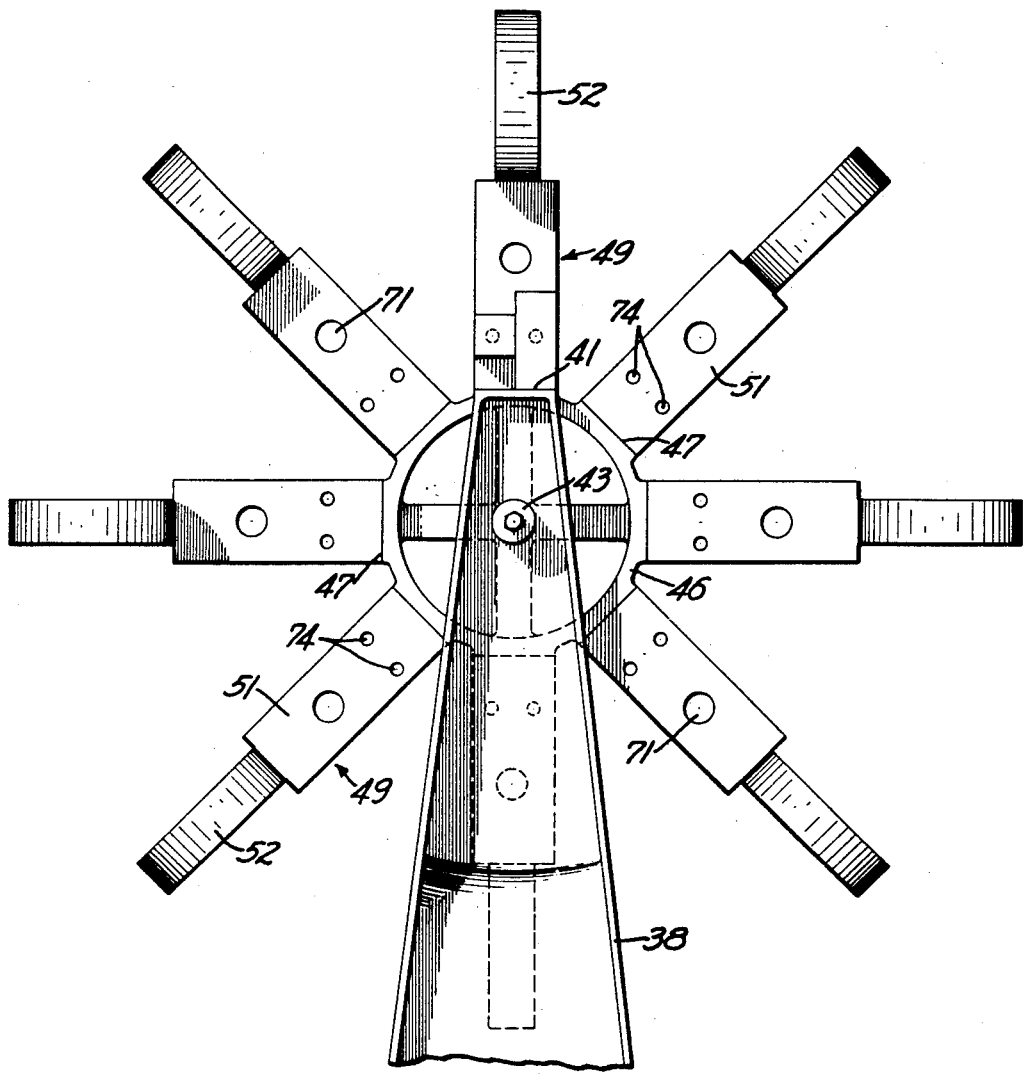

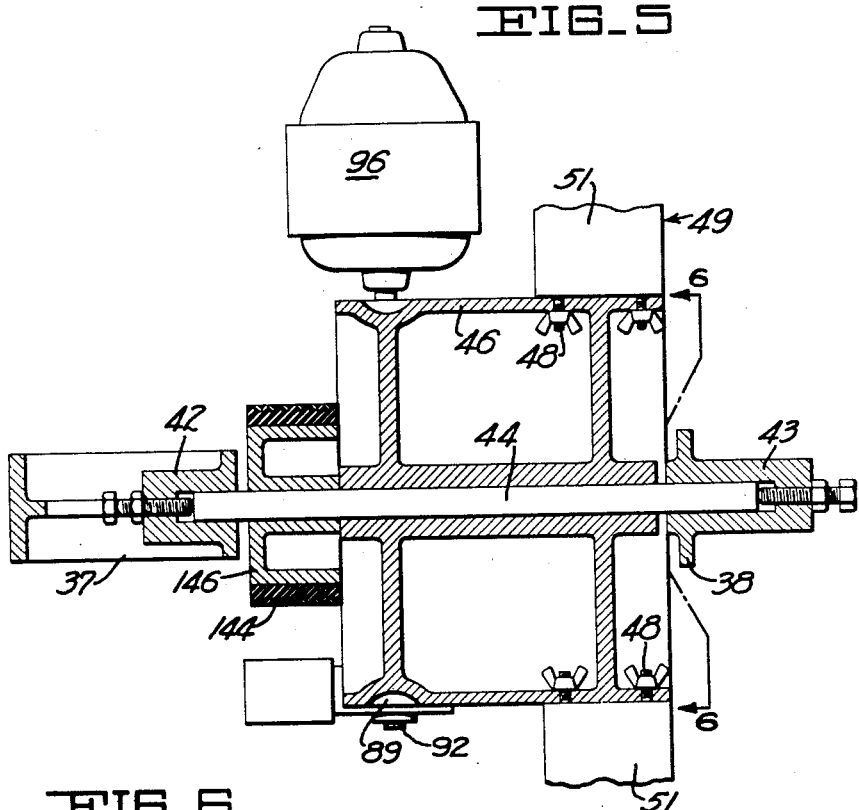
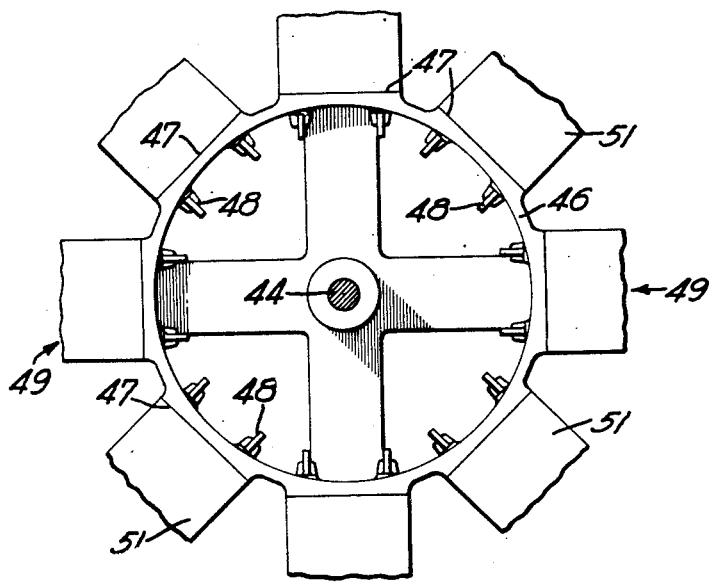

Nov. 21, 1939.    J. H. McMAHON ET AL    2,180,639
AMUSEMENT APPARATUS
Filed Jan. 3, 1938    8 Sheets-Sheet 6
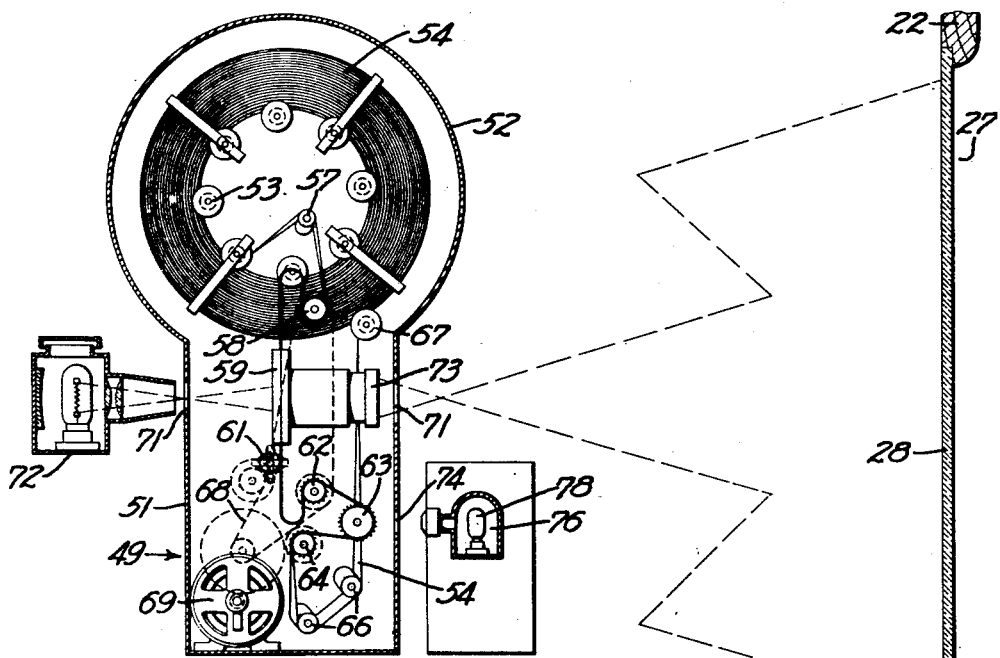
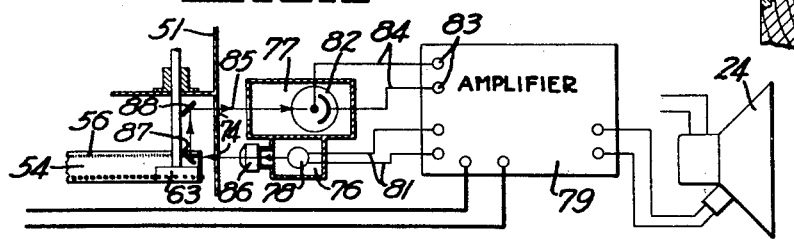
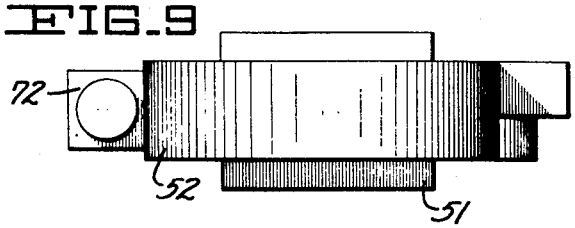
INVENTORS
JOHN H. McMAHON
ARTHUR W. MILLER
BY *Harry C. Schwed*
ATTORNEY Nov. 21, 1939. J. H. McMAHON ET AL 2,180,639
AMUSEMENT APPARATUS
Filed Jan. 3, 1938 8 Sheets-Sheet 7

INVENTORS
JOHN H. McMAHON
ARTHUR W. MILLER
BY Harry J. Schroeder
ATTORNEY

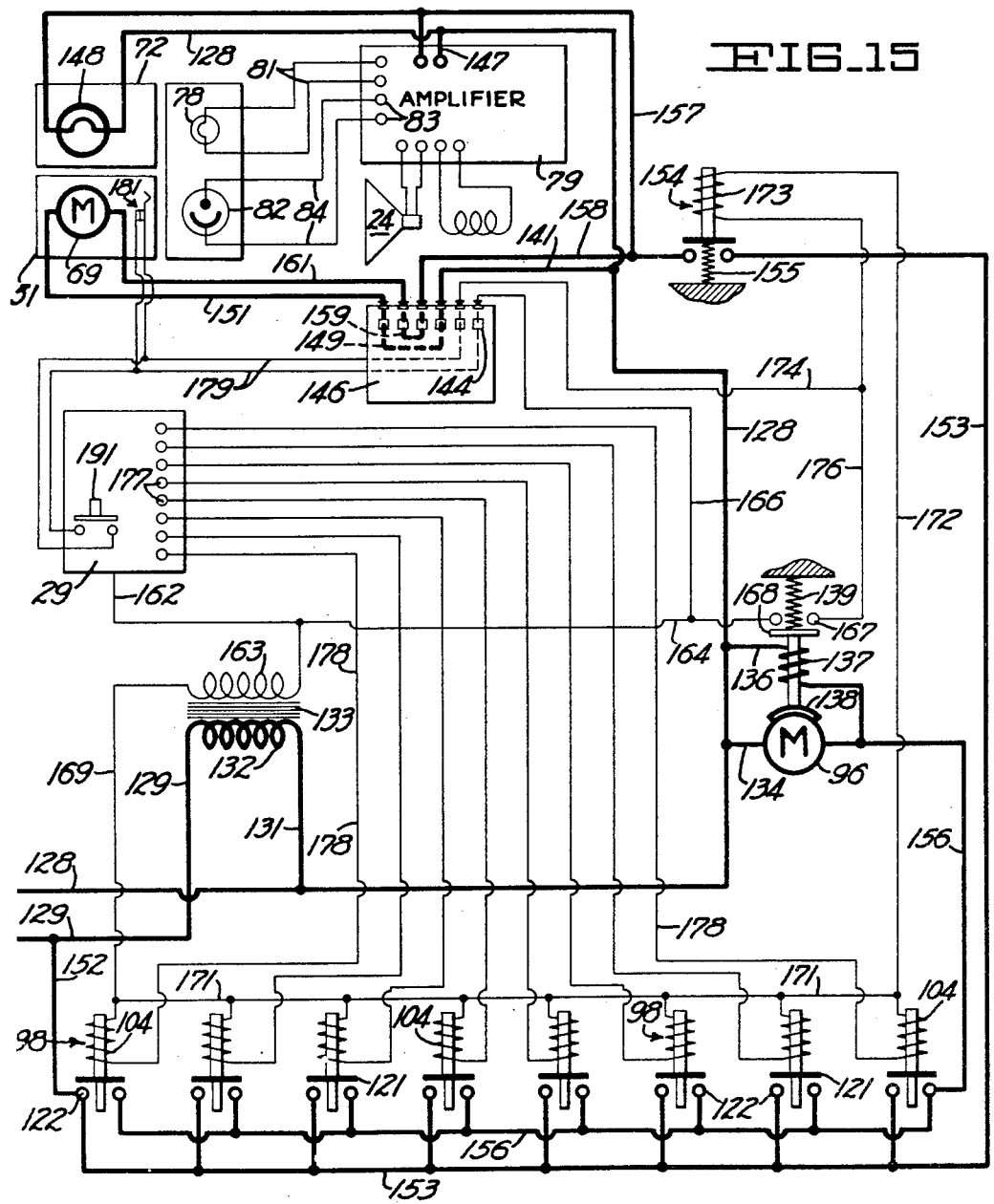

Patented Nov. 21, 1939

2,180,639

UNITED STATES PATENT OFFICE 2,180,639

AMUSEMENT APPARATUS

John H. McMahon and Arthur W. Miller, Berkeley, Calif.

Application January 3, 1938, Serial No. 183,110

9 Claims. (Cl. 88—16.2)

REISSULD
JAN 15 1946

This invention relates to automatic coin-operated devices used for public amusement and is an improvement over the structure disclosed in our prior application, Serial No. 171,236, filed October 27, 1937.

It is an object of the present invention to provide a device which will automatically select, display and reproduce a visible animated picture and sound related to the characters of the picture.

Another object of the invention is to provide, in a device of the character described, a plurality of mechanisms for reproducing the visual records, and means common to each of the mechanisms for reproducing the sound records and for projecting the pictures.

A further object of the invention is to provide simplified apparatus of the class referred to which includes, without crowding, a maximum number of reproducing mechanisms.

The invention possesses other objects and features of advantage, some of which, together with the foregoing, will be specifically set forth in the detailed description of the preferred form of the invention hereunto annexed. It is to be understood that the invention is not to be limited to the particular species thereof shown and described as various other embodiments thereof may be employed within the scope of the appended claims.

Referring to the drawings:

Figure 2 is a vertical sectional view of the device. The plane of section is indicated by the line 2—2 of Figure 1.

Figure 3 is an end elevational view, partly in section, of the projector turret and its associated mechanism. The view is taken along the line and in the direction of the arrows 3—3 of Figure 2.

Figure 4 is an end elevational view of the projector turret. The view is taken looking in the direction of the arrow 4 of Figure 2.

Figure 5 is a horizontal sectional view taken through the turret mechanism along the line 5—5 of Figure 2.

Figure 6 is a fragmental end elevational view of the turret. The view is taken along the line 6—6 of Figure 5.

Figure 7 is a vertical sectional view taken through one of the projectors and associated parts.

Figure 8 is a view, partly diagrammatic and partly in horizontal section, showing the sound translating mechanism.

Figure 9 is a top plan view of the structure shown in Figure 7.

Figure 15 is a schematic wiring diagram showing the connections between the various electrical components of the apparatus.

Figure 1:
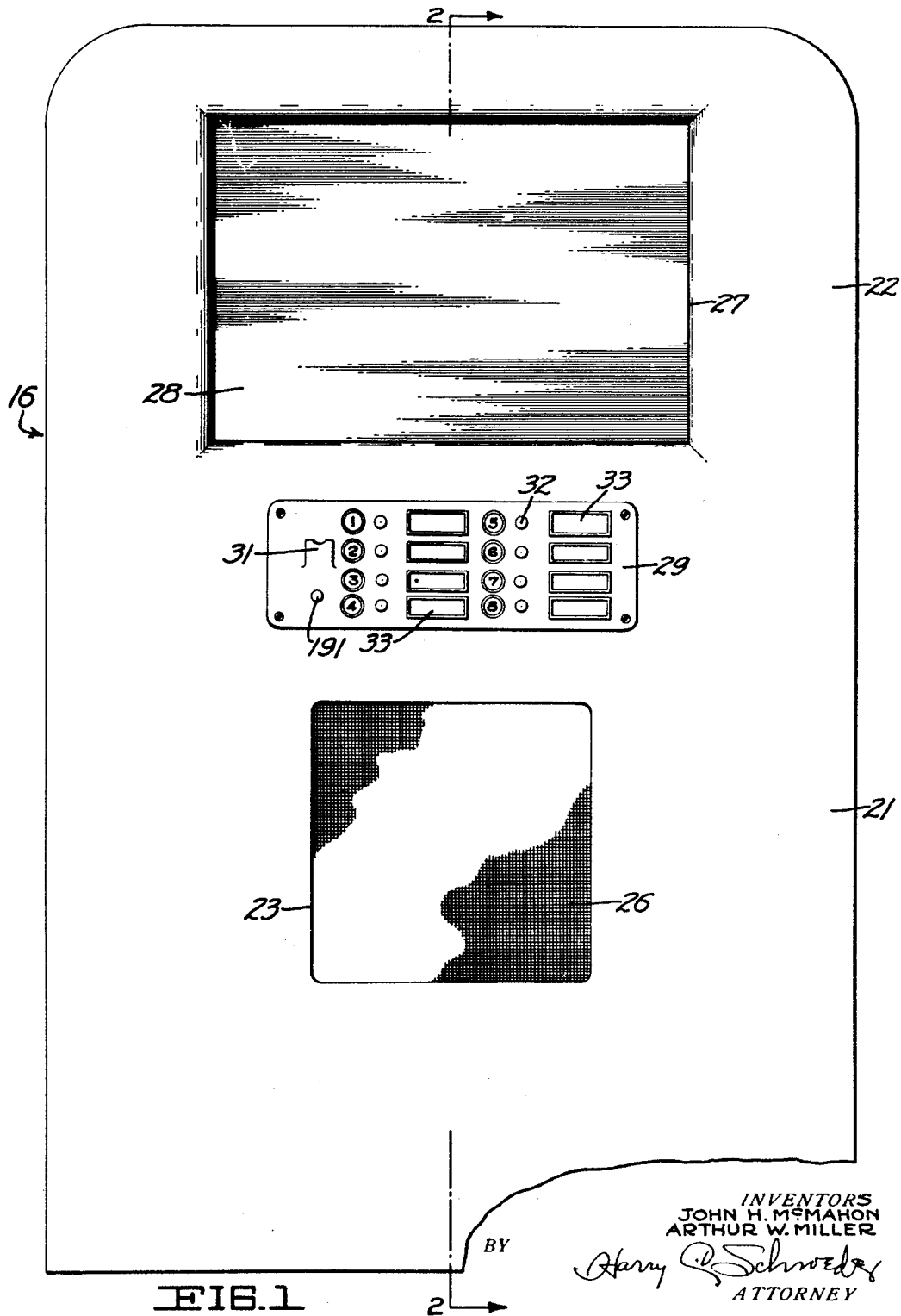
Figure 1 is a front elevational view of the cabinet housing the amusement device of our invention.

Describing the invention in detail, the apparatus comprises a cabinet 16 having side walls 17, a top 18, a bottom floor 19, and a front panel 25 consisting of a lower perpendicular portion 21 and a rearwardly inclined upper portion 22. On the inner surface of the lower panel portion 22, overlying an aperture 23 therein, is mounted a sound reproducer such as the dynamic speaker 24. The usual cloth screen 26 covers the aperture 23 so as to prevent the entrance, into the magnetic gap of the speaker, of dust or other particles of foreign matter. In a large rectangular aperture 27, provided in the upper portion 22 of the panel, is mounted a picture projection screen 28 which may either be composed of the particular type of fabric commonly used for exhibiting daylight movies overlaid by a sheet of transparent glass or which may be the sheet of glass above the latter having one surface thereof frosted. The usual coin-operated program selector 29 having a coin chute 31, a plurality of push buttons 32 by means of which various sound and visual records may be selected, and card holders 33 which contain the title and other information relative to the records, are mounted on the panel intermediate the speaker aperture and the picture screen.

Mounted on a base plate 34, which is secured to the floor 19 by bolts 36, is a pair of spaced vertically disposed brackets 37 and 38, each having at their upper ends mounting pads 39 and 41, and at points intermediate their ends with hubs 42 and 43 each of the latter being axially bored to rotatably receive the ends of the turret shaft 44. Fixed to and rotatable with the shaft 44 is a cylindrical turret 46 having at one end thereof a plurality, preferably eight, of mounting pads 47 to each of which is attached, by mounting bolts 48, the motion picture projecting unit generally indicated by the reference numeral 49, each of said units includes a film carrier, a film actuating motor and a projector.

Figure 14:
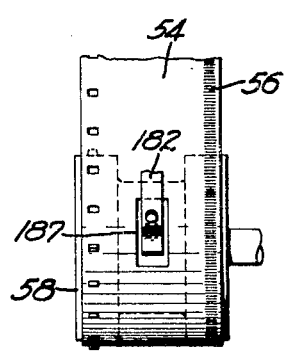
Figure 14 is a front elevational view of a portion of the structure shown in Figure 13. The view is taken along the line 14—14 of the latter figure.

Each of the projecting units 49, as is shown in Figure 7, comprises a casing 51 having in the upper portion thereof a cylindrical magazine 52 in which is supported, by a plurality of rollers 53, a roll of motion picture film 54 of the variety having thereon, as is shown in Figures 8 and 14, a sound track 56 related to the pictorial subject matter of the film. The opposite ends of the film are spliced together to provide an endless loop which is threaded, from the inner convolution of the roll 54, over a guide roller 57, the upper feed sprocket 58, through the film gate 59, past and in engagement with the intermittent drive sprocket 61, over the lower feed sprocket 62, over the idler sprocket 63, over a take-up sprocket 64 which maintains the film in close engagement with the periphery of the idler sprocket 63, over guide rollers 66, and onto the outside of the roll 54 over a guide roller 67. Each of the sprockets 58, 61, 62 and 64 are connected, by suitable means such as the chain 68, to be driven by a motor 69. In the front and rear walls of the casing 51 are provided ports 71 through which a beam of light from a lamp house 72 which is mounted on the pad 39 may pass and a lens 73 projects the light beam onto the surface of the screen 28. In the lower portion of the front wall of the casing 51 is a pair of spaced horizontally alined apertures 74 one of which is in axial alinement with the sound track of the film passing over the idler roller 63. On the pad 41 at the upper end of the bracket 38 is a casing having therein a pair of chambers 76 and 77, the former of which contains an exciter lamp 78 which may be energized either by direct current or by high frequency alternating current from the amplifier 79 through leads 81, and the other of which contains a photoelectric cell 82 connected with the input terminals 83 of the amplifier by leads 84. The exciter lamp 78 is positioned to project light rays along the path indicated by the arrows 85 through a condensing lens 86, through an aperture 74, through the sound track 56 of the film, onto the surface of a light reflecting member 87, which may be a mirror and which is positioned at an angle with respect to the path of the light rays, across toward another light reflecting mirror 88 and thence through the other aperture 74 into the chamber 76 and the photocell 82. A pulsating electric current is thus produced which is fed to the amplifier through the input leads 84. Each one of the projectors on the turret 46 is identical in structure with the one described above.

Means is provided for moving a selected one of the projectors into position to display the pictorial record of the film thereof on the screen and to reproduce the sound record of the film through the speaker 24. In the periphery of the turret 46, at the end thereof opposite to that upon which the projectors are mounted, teeth are provided which form a worm gear 89 with which meshes a worm 91 mounted for rotation with a shaft 92 which is journaled in bearings 93 carried by a bracket 94 secured to the bracket 37. A motor 96 mounted on an extension of the bracket 94 is connected through a coupling 97 with the shaft 92 to rotate the latter. Upon energization of the motor 96 the turret will be rotated so as to move each projector, in succession, past the lamp house 72 and the casing containing the exciter lamp 78 and the photo-cell 82.

Figure 10:
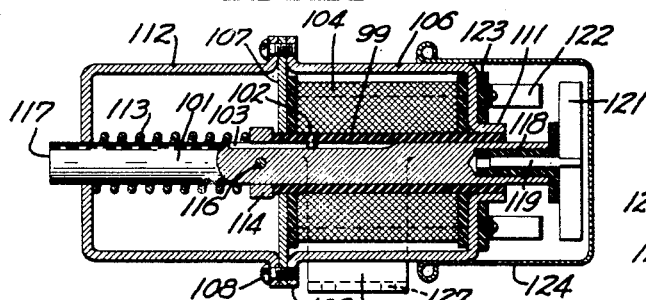
Figure 10 is a vertical sectional view of one of the turret control relays.
Figure 11:
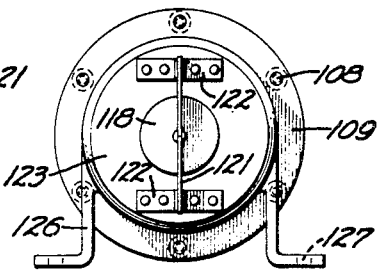
Figure 11 is an end elevational view, with the protective cover removed, of the structure shown in Figure 10.

Means is provided for positioning a selected one of the projectors in registry with the fixed lamp house, photo-cell and exciter lamp. Mounted on each of the projector casings 51 is a solenoid switch, generally indicated by the numeral 98 in Figure 2 and shown in detail in Figures 10 and 11, comprising a sleeve 99 of insulating material in which an armature 101 is axially slidable, a pin 102 secured in the sleeve being provided and working in a keyway 103 in the armature to prevent rotation of the latter with respect to the sleeve. Wound on a portion of the sleeve 94 is an actuating coil 104 and around the coil is an iron shell 106 forming part of a ferro-magnetic circuit which also consists of an iron plate 107 secured by screws 108 to a flange 109 at one end of the shell 106 and a divided sleeve 111, which is formed as an integral part of the shell at the opposite end of the latter, being positioned closely adjacent the armature and insulated therefrom by the sleeve 99. A preferably non-magnetic cap 112, also secured to the shell 106 by the screws 108, is provided with an aperture through which the armature is freely slidable and a spring 113, interposed between a portion of the cap and a collar 114 secured to the armature by a pin 116, serves to resiliently maintain the extreme end 117 of the armature in retracted position adjacent the cap 112. One end of the armature is bored out to frictionally receive and retain an insulating bushing 118 which is centrally bored and into which is passed the shank 119 of a switch blade 121. This switch blade, when the armature 101 is moved axially, is adapted to enter between and engage spaced contacts 122 which are mounted on an insulating disk 123 secured to the shell 106. A cover 124 is adapted to frictionally telescope over the end of the shell so as to protect the switch against dirt and damage, and feet 126 are provided on the shell having therein screw holes 127 which receive suitable screws for mounting the device on the projector casing 51. It will be seen that when the coil 104 is energized the armature 101 will be moved to the left, as viewed in Figure 10, being impelled by the flux in the magnetic circuit which will close the switch 121—122 against the tension of the spring 113 and retain the switch in its closed position until, upon deenergization of the coil 104, the spring forces return of the switch to its open position.

Referring now to the wiring diagram of Figure 15, a pair of power supply leads 128 and 129 are provided which may be connected to a suitable source of alternating current. The former of these leads is connected by a branch lead 131 with the primary winding 132 of a step-down transformer 133, which supplies low voltage current for the control circuits to be described presently, by a branch lead 134 with the motor 96, by a branch lead 136 with the winding 137 of a solenoid brake 138 which, being connected in parallel with the motor, is released against the tension of a spring 139 when the motor is energized and applied by the spring when the motor is deenergized so as to instantly check the momentum of the latter, by a branch lead 141 with one of a set of contact brushes 142 which are mounted on an insulating block 143 carried by the bracket 37 and bear against contact segments 144 on a commutator 146 fixed for rotation with the turret shaft 44, by a branch lead 147 with the amplifier 79, and, directly, with the projector lamp 148 contained in the lamp house 72. There are, on the commutator 146, eight sets of contact segments 144, one set being provided for each of the projectors carried by the turret and four contact segments of each set carry high voltage current while the remaining two contact segments carry low voltage current for a control circuit. A jumper lead 149 conducts current from the contact segment, with which the lead 141 is in engagement, to another of the high voltage contacts and a lead 151 conducts this current to the projector motor 69.

The second supply lead 129 connects directly with the primary coil of the transformer 133 and, by a lead 152, with a conductor 153 which connects with one switch contact 122 of each of the eight solenoid switches 98. A continuation of the conductor 153 runs to one contact of a relay 154 whose function will be presently described and which is held normally open by means of a spring 155. Each of the other contacts 122 of the solenoid switches 98 are connected together by a lead 156, a continuation of which runs to the motor 96 and to the actuating coil 137 of the solenoid brake. From a contact of the relay 154 a lead 157 connects with the amplifier 79 and the projector lamp 148 and a branch lead 158 runs to one of the contact brushes 142. A jumper lead 159 connects the contact segment, with which the brush connected to the lead 158 is in engagement, and another of the contact segments, and a lead 161, terminating at one end at the projector motor 69, is connected to another of the brushes engaging the contact segment joined to the jumper lead 159.

Figure 12:
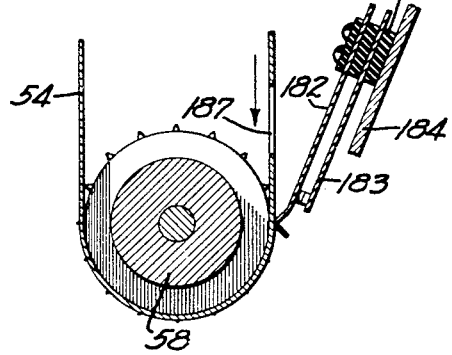
Figure 12 is a fragmental vertical sectional view of the apparatus showing, in its closed position, the limit switch which controls the cycles of movement of the picture film.
Figure 13:
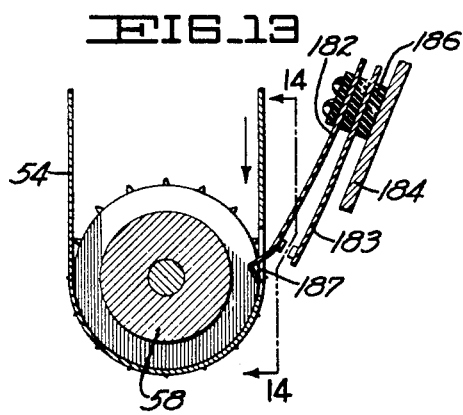
Figure 13 is a view, similar to Figure 12, showing the limit switch in its open position.

The coin-operated selector switch 29 is provided with a low voltage input lead 162 which derives current from the secondary winding 163 of the transformer 133 and continuation leads 164 and 166 connect the transformer secondary winding, respectively, with one of a pair of contacts 167 which are closed by a contactor 168 when the solenoid brake is released, and with one of the low voltage brushes 142. The opposite end of the secondary winding of the transformer 133 is connected by a lead 169 with a conductor 171 which joins together one end of each actuating coil 104 of the solenoid switches 98. A continuation 172 of the conductor 171 runs to one end of the actuating coil 173 of the relay 154 and the other end of the coil is connected by leads 174 and 176, respectively, with one of the low voltage brushes 142 and with a contact 167 of the switch operated by the solenoid brake. The pushbuttons of the selector switch operate, in a manner well known in the art, contacts which establish connection between the lead 162 and a selected one of the eight output terminals 177, depending upon which pushbutton is depressed, and a time delay device, which is also well known in the art and in the nature of a dashpot, maintains this connection during an interval of time sufficiently long to allow components of the apparatus to complete their cycles of operation before the connection is interrupted. Connecting each terminal 177 and one end of the several actuating coils of the solenoid switches 98 is a lead 178. The two low voltage contact segments of the commutator are connected by leads 179 with a limit switch generally indicated, in the wiring diagram, by the numeral 181. This limit switch is shown in detail in Figures 12 to 14 inclusive and comprises a pair of resilient arms 182 and 183 mounted adjacent one end thereof on a fixed portion 184 of the projector casing 51 and insulated therefrom by a block of insulating material 186. As shown in Figure 13 the normal position of the switch is open, the distal end of the arm 182 entering an aperture 187 provided in the film. As soon as the film starts to move the arm 182 will rise out of the aperture 187 and will bear against the surface of the film as is shown in Figure 12 thereby closing the switch and maintaining the latter in this condition during the time that it requires the aperture 187 and the film to complete one cycle through the projector whereupon when the aperture again comes into registry with the end of the arm 182 the switch will open. It will be noted in the wiring diagram that the limit switch above described and the switch 167—168, which is operated by release of the solenoid brake of the motor 96, are connected in parallel.

When a coin is deposited in the coin chute 29 and a selected pushbutton is depressed, current will flow from the transformer secondary 163 through the lead 162, through the contacts engaged by the depressed pushbutton, through one of the leads 178 to the coil 104 of the solenoid switch mounted on that projector which contains the visual and audible record desired to be viewed and heard, through the coil 104, and back to the transformer secondary via the leads 171 and 169. Energization of the coil 104 has simultaneously closed the switch 121—122 and extended the end 117 of the armature from its normal retracted position toward the axis of the turret. As soon as the switch 121—122 has closed, current will flow from the lead 129 through the leads 152 and 153 across the closed contacts 122, through the lead 156, through the coil 137 of the solenoid brake, and the motor 96 and through the leads 136 and 134 back to the supply lead 128. This will simultaneously start the motor 96, release the solenoid brake so that the motor may rotate, and close the switch 167—168. As the motor rotates, the turret will be rotated moving the projector carrying the desired film selection toward the lamp house 72 and the casing containing the exciter lamp 78 and the photo-cell 82. As soon as this position is reached, the extended armature 101 of the solenoid switch will come in contact with the sloping surface of a cam 188 formed at the end of an arm 189 secured in fixed relation to the bracket 37. Continued rotation of the turret to move the armature upwardly along the cam surface will cause the armature to be retracted, against the magnetic force tending to extend the armature, until the switch blade 121 is separated from the contacts 122 thereby opening the circuit to the motor 96, deenergizing the latter and the coil of the solenoid brake and allowing the spring 139 to set the brake which will practically stop the motor instantaneously. When the motor has stopped the projector will be positioned with its apertures 71 and 74 in correct alinement with the axes of the light beams from the projector lamp and the exciter lamp respectively.

While the motor 96 was running, to index the turret, the switch 167—168 was closed. This permitted current to flow from the transformer secondary 163 through the lead 164, the closed switch, the lead 176, the coil 173 of the relay 154, and back to the secondary winding via the leads 172, 171 and 169. Establishment of this circuit closed the contacts of the relay 154 allowing high voltage current to flow from the lead 153 through the closed contacts, through the lead 157 to energize the amplifier 79 and the projector lamp 148 and back to the supply lead 128. The exciter lamp becomes energized when the amplifier is energized. When the turret is indexed to its correct position, the group of contact segments 144, associated with the projector selected, will be in contact with each of the brushes 142 thereby establishing circuit through the lead 158, the jumper lead 159 and the lead 161 to the projector motor 69 and back from the motor through the lead 151, the jumper lead 149 and the lead 141 to the supply lead 128. The projector motor, being now energized, will start to rotate to run the film through the projector. As soon as the film starts to move, as was explained above, the limit switch 181 will close which is the equivalent of short circuiting the contacts 167. Thus, when the motor 96 is stopped and the brake is set, the opening of the contacts 167 by the contactor 168 will not affect the relay 154 which will remain closed until the limit switch 181 opens after the film has completed its cycle. When the relay 154 opens the amplifier and the projection lamp and motor will be each deenergized. Should it be desired, after the completion of a selection, to repeat the performance of the same selection, a coin may be deposited in the coin chute and, by depressing a pushbutton 191, the contacts 167 may be manually short circuited thereby reclosing the relay 154 and energizing the amplifier, the projection motor 69 and the projection lamp 148 for an additional cycle of operation. The provision of the repeat button is essential since it is impossible to repeat a selection by manipulation of the selector switch since the solenoid switch on the selected projector is held open by the cam 188.

From the foregoing description of our invention, it will be seen that we have provided an improved and simplified structure over that disclosed in our prior application, that the arrangement of the parts is such that a maximum number of projectors are included in the mechanism without rendering the size of the device prohibitive, that the operation of the device may be so readily understood that it does not require the services of highly skilled help in its maintenance, and that the device is so ruggedly constructed that it will enjoy a long, useful and trouble-free life.

We claim:

1. An amusement apparatus comprising a pair of spaced brackets, a shaft journaled in said brackets, a cylindrical turret secured to and rotatable with said shaft, worm teeth in the periphery of and adjacent one end of said turret, a worm journaled on one of said brackets and meshing with the worm teeth of said turret, an electric motor carried by one of said brackets and operatively connected to rotate said worm, a plurality of fixed contact fingers, to which electric current conductors may be attached, mounted on one of said brackets, a plurality of electrically actuated picture projectors mounted on said turret, a fixed light source carried by one of said brackets and positioned to project light to a predetermined location, means to energize said motor to rotate said turret and move said projectors successively past said light source, means to stop said turret at predetermined degrees of rotation thereof, and separate groups of electrical contacts associated with each projector and movable, upon movement of said turret, into contact with said contact fingers.

2. An amusement device comprising a pair of spaced, rearwardly inclined, brackets, a shaft journaled in said brackets, a cylindrical turret fixed to and rotatable with said shaft, worm teeth in and adjacent one end of said turret, a worm journaled for rotation on one of said brackets and meshing with said turret worm teeth, an electric motor mounted in said cabinet and connected to rotate said worm and turret, a light source carried by one of said brackets and positioned to project light to a predetermined location, a casing carried by the other of said brackets and provided with a pair of chambers one of which contains a lamp adapted to project a condensed beam of light rays and the other of which contains a photo-electric device, a plurality of motion picture projectors mounted on said turret, each of said projectors comprising a casing having therein mechanism for moving a motion picture film having a sound record thereon, means to move the sound record of said film through said condensed light beam, means to direct the light beam modulated by said sound record into said photo-electric device, and a projection lens for projecting rays from said light source after passing through said film onto the screen, said projectors being adapted to move, upon rotation of said turret, between said spaced brackets and into registry, successively, with said light source, said lamp and said photo-electric device, means for preselectively stopping the rotation of said turret to position a selected one of said projectors in registry with the aforesaid elements, and means to translate said modulated light beam into audible sound.

3. An amusement apparatus comprising a cabinet provided with a picture screen, a fixed lamp adapted to project its beam to said screen, a rotatable turret provided with a plurality of radiating supports, a plurality of film projecting units secured to the respective supports, there being one unit for each support, so positioned that during rotation of the turret said units will travel successively past said lamp, a fixed member, a motor for rotating said turret, and selective control means for said motor, said control means including independently operable selective motor-disabling means carried by each support and operable by engagement with said fixed member during rotation of the turret to stop the motor in such manner as to place the projector of a preselector projecting unit in register with said lamp and said screen.

4. An amusement apparatus comprising a cabinet provided with a picture screen, a fixed lamp adapted to project its beam to said screen, a rotatable turret provided with a plurality of radiating supports, a plurality of film projecting units secured to the respective supports, there being one unit for each support, so positioned that during rotation of the turret said units will travel successively past said lamp, a fixed member, a motor for rotating said turret, a plurality of independently operable selector devices controlling said motor, there being one selector device for each projector unit and mounted upon a support of said turret, and means for selectively operating any pre-selected selector device to start the motor, each selector device including independently operable selective motor-disabling means operable by engagement with said fixed member during rotation of the turret in such manner as to present a pre-selected projecting unit to a position with its projector in register with said lamp and said screen.

5. An amusement apparatus comprising a cabinet provided with a picture screen, a fixed lamp adapted to project its beam to said screen, a rotatable turret provided with a plurality of radiating supports, a plurality of film projecting units secured to the respective supports, there being one unit for each support, so positioned that during rotation of the turret said units will travel successively past said lamp, a fixed member, a motor for rotating said turret, a plurality of motor controlling switches, one on each support, and each having means for controlling the motor circuit, and also including an independently operable selective motor disabling means, there being one switch for each projector unit, and selective means for energizing any pre-selected switch and simultaneously setting said motor-disabling means, said motor-disabling means being operable by engagement with said fixed member during rotation of the turret to stop the motor in such manner as to place a pre-selector projecting unit with its projector in register with the lamp and the screen.

6. An amusement apparatus comprising a cabinet provided with a picture screen, a fixed lamp adapted to project its beam to said screen, a rotatable turret provided with a plurality of radiating supports, a plurality of film projecting units secured to the respective supports, there being one unit for each support, so positioned that during rotation of the turret said units will travel successively past said lamp, a fixed member, a motor for rotating said turret, a plurality of solenoid switches, one for each projecting unit and each mounted upon and movable with a radiating support, each switch having an independently operable motor-disabling projection, each switch having selectively operable means for controlling the motor circuit, and selective means for energizing any pre-selector solenoid switch in such manner as to cause the disabling projection thereof to extend to a position to engage said fixed member during rotation of the turret, said disabling projections being independently operable by engagement thereof with the fixed member during rotation of the turret so as to stop the motor in a manner to place a pre-selected projecting unit with its projector in register with the lamp and with said screen.

7. An amusement apparatus comprising a cabinet having a picture screen, a pedestal within the cabinet having oppositely disposed bearing brackets, a turn table journaled between said brackets and having a plurality of equally spaced radiating supports, a plurality of independently operable film projecting units secured to the respective supports, there being one unit for each support so positioned that during rotation of the turret said units will travel successively between the lamp and the screen, a motor for rotating the turret, selective control means for said motor, said control means including independently operable selective motor-disabling means each carried by a support of the turret, and a fixed cam supported by one of said brackets, said motor-disabling means being operable by engagement with said cam during rotation of the turret so as to stop the motor in such manner as to place a pre-selected projecting unit with its projector in register with said lamp and with said screen.

8. An amusement apparatus comprising a cabinet provided with a picture screen, a fixed lamp adapted to project its beam to said screen, a rotatable turret provided with a plurality of radially disposed supports, a plurality of film projecting units secured to the respective supports, there being one unit for each support so positioned that during rotation of the turret said units will travel successively past said lamp, a fixed member, a motor for rotating said turret, selective control means for said motor, said control means including independently operable selective motor-disabling means carried by each support and operable by engagement with said fixed member during rotation of the turret so as to stop the motor in a manner to place a pre-selector projecting unit with its projector in register with said lamp and with said screen, a selector switch including a plurality of fixed members each controlling the operation of a picture projecting unit and also including a complemental movable member secured to and rotative with said turn table, the last mentioned selector switch having means for selectively operating a pre-selected projecting unit for a limited time after said unit has been stopped in its pre-selected position.

9. An amusement apparatus comprising a cabinet provided with a picture screen, a fixed lamp adapted to project its beam to said screen, a rotatable turret provided with a plurality of radially disposed supports, a plurality of film projecting units secured to the respective supports, there being one unit for each support so positioned that during rotation of the turret said units will travel successively past said lamp, a fixed member, a motor for rotating said turret, selective control means for said motor, said control means including independently operable selective motor-disabling means carried by each support and operable by engagement with said fixed member during rotation of the turret so as to stop the motor in a manner to place a pre-selected projecting unit with its projector in register with said lamp and with said screen, a selector switch including a plurality of fixed members each controlling the operation of a picture projecting unit and also including a complemental movable member secured to and rotative with said turn table, the last mentioned selector switch having means for selectively operating a pre-selected projecting unit for a limited time after said unit has been stopped in its pre-selected position, and means controlled by the operation of the projector for stopping the same at the end of its operating cycle.

JOHN H. McMAHON.
ARTHUR W. MILLER.